US012472114B2

(12) United States Patent
Christensen

(10) Patent No.: US 12,472,114 B2
(45) Date of Patent: Nov. 18, 2025

(54) COMBINED LIFT AND TILT SYSTEM AND A WHEEL CHAIR WITH A BUILT-IN SEAT HOIST INCLUDING SUCH A SYSTEM

(71) Applicant: GLOBAL FABTECH (SHANGHAI) COMPANY LIMITED, Shanghai (CN)

(72) Inventor: Hans Balle Christensen, Herning (DK)

(73) Assignee: GLOBAL FABTECH (SHANGHAI) COMPANY LIMITED, Shanghai (CN)

( * ) Notice: Subject to any disclaimer, the term of this patent is extended or adjusted under 35 U.S.C. 154(b) by 895 days.

(21) Appl. No.: 17/608,618

(22) PCT Filed: May 6, 2020

(86) PCT No.: PCT/IB2020/054278
§ 371 (c)(1),
(2) Date: Nov. 3, 2021

(87) PCT Pub. No.: WO2020/225743
PCT Pub. Date: Nov. 12, 2020

(65) Prior Publication Data

US 2022/0226176 A1 Jul. 21, 2022

(30) Foreign Application Priority Data

May 8, 2019 (DK) ............................ PA201970293

(51) Int. Cl.
*A61G 5/14* (2006.01)
*B66F 7/06* (2006.01)

(52) U.S. Cl.
CPC .............. *A61G 5/14* (2013.01); *B66F 7/0691* (2013.01)

(58) Field of Classification Search
CPC .. A61G 5/1059; A61G 5/1056; A61G 5/1075; A61G 5/14; A61G 7/019;
(Continued)

(56) References Cited

U.S. PATENT DOCUMENTS 3,902,616 A * 9/1975 Santic .................. B66F 7/0683 414/420
5,950,977 A * 9/1999 Proksch ................ B60N 2/508 248/421

(Continued)

FOREIGN PATENT DOCUMENTS

CN 107296693 A 10/2017
CN 109316295 A 2/2019

(Continued)

OTHER PUBLICATIONS

Extended European Search Report dated Jun. 13, 2023 (5 pages) out of corresponding European application 20802801.9.

(Continued)

*Primary Examiner* — Anne Marie M Boehler
(74) *Attorney, Agent, or Firm* — Crowell & Moring LLP; John C. Freeman

(57) ABSTRACT

A combined lift and tilt system including a lower frame, an upper frame, a first lever arm rotatably connected to the lower frame, and a second lever arm rotatably connected to the first lever arm and to the upper frame and in sliding engagement with the lower frame. The system further including a first linear power source rotatably connected to the lower frame and to the first lever arm, and a second linear power source rotatably connected to the upper frame and to the second lever arm.

8 Claims, 15 Drawing Sheets

Figure 1A:
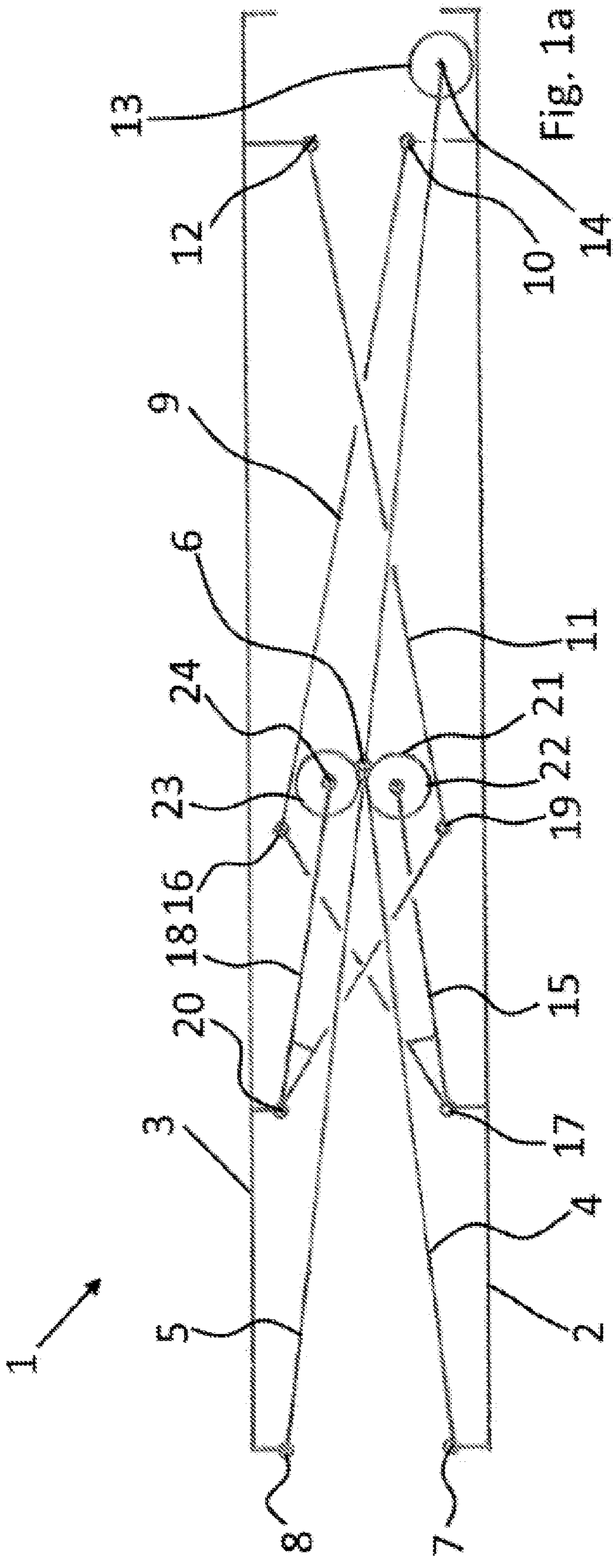

(58) Field of Classification Search
CPC ... A61G 7/1046; A61G 7/1059; B66F 7/0683; B66F 7/0691; B66F 7/0625; B66F 7/0666; B60P 1/34
See application file for complete search history.

(56) References Cited

U.S. PATENT DOCUMENTS

| | | | | |
|---|---|---|---|---|
| 9,033,360 | B2 | 5/2015 | Davis et al. | |
| 2005/0046129 | A1 | 3/2005 | Antonishak et al. | |
| 2014/0103277 | A1 * | 4/2014 | Cormack | B66F 7/065 254/89 R |
| 2014/0262566 | A1 | 9/2014 | Davis et al. | |
| 2015/0282619 | A1 | 10/2015 | Lawson | |
| 2019/0070052 | A1 | 3/2019 | Humbert et al. | |
| 2020/0062562 | A1 | 2/2020 | Christensen | |

FOREIGN PATENT DOCUMENTS

| | | | |
|---|---|---|---|
| FR | 67448 | E | 3/1958 |
| WO | WO 99/62813 | A1 | 12/1999 |
| WO | WO 2012/118435 | A1 | 9/2012 |
| WO | WO 2018/096447 | A1 | 5/2018 |
| WO | WO 2019/044695 | A1 | 3/2019 |

OTHER PUBLICATIONS

Search Report dated (nine pages) dated Nov. 12, 2019 from Danish Priority Application No. PA 2019 70293.

International Search Report (two pages) dated Aug. 10, 2020 from PCT Priority Application No. PCT/IB2020/054278.

Written Opinion (eight pages) dated dated Aug. 10, 2020 from PCT Priority Application No. PCT/IB2020/054278.

* cited by examiner

COMBINED LIFT AND TILT SYSTEM AND A WHEEL CHAIR WITH A BUILT-IN SEAT HOIST INCLUDING SUCH A SYSTEM

This application is a national application based on Patent Cooperation Treaty Patent Application No. PCT/IB2020/054278, filed on May 6, 2020, the entire contents of which are incorporated herein by reference.

This application claims under 35 U.S.C. § 119 (a) the benefit of the filing date of Danish Patent Application No. PA201970293, filed on May 8, 2019, the entire contents of which are incorporated herein by reference.

BACKGROUND OF THE INVENTION

Field of the Invention

The present invention relates to a combined lift and tilt system, for instance to be mounted in an electric wheel chair for adjustment of the height and/or the inclination of the seat thereof.

Related Art

The use of lift systems and tilt systems in tables, chairs and beds, etc. is well-known. The majority of such systems operate according to the so-called "scissor principle". In such systems, a lower frame and an upper frame are connected by two lever arms pivotally connected in a configuration similar to the one of the two arms in a pair of scissors. Most often, there are two pairs of such "scissored" lever arms arranged in two opposite sides of the system, respectively, being driven by a common actuator such as, for instance, a hydraulic or electric linear actuator.

Although many good solutions for lift systems and tilt systems are provided using this "scissor principle", the flexibility of such systems is limited because the function performed, i.e. lifting or tilting, is determined by the mechanical construction of the system. Thus, a given system is designed and constructed to perform either a lifting function or a tilting function (to one side from a horizontal position), and if both a lifting function and a tilting function are required, both a lift system and a tilt system are needed or some kind of mechanical reconfiguration of the system must be performed when switching between the lifting function and the tilting function.

BRIEF DESCRIPTION OF THE INVENTION

It is an object of the present invention to provide a combined lift and tilt system, which overcomes the above-mentioned disadvantages of lift systems and tilt systems known in the art.

The present invention relates to a combined lift and tilt system, which mechanism includes a lower frame and an upper frame, which are connected by at least one pair of lever arms rotatably connected to each other in a pivotal point, wherein, at least in a contracted configuration of the mechanism, the lower frame and the upper frame are substantially parallel to each other, wherein a first lever arm is rotatably connected at its lowermost end to the lower frame in a fulcrum and the second lever arm is rotatably connected at its uppermost end to the upper frame in a fulcrum and in sliding engagement with the lower frame at its lowermost end in such a way that, when the lowermost end of the second lever arm is moved towards the lowermost end of the first lever arm, the end of the upper frame, to which the uppermost end of the second lever arm is connected, is forced away from the lower frame, wherein a first linear power source, such as a linear actuator, is rotatably connected at its lowermost end to the lower frame in a fulcrum and directly or indirectly connected at its uppermost end to the first lever arm in such a way that an extension of the length of the first linear power source causes the lowermost end of the second lever arm to be pulled towards the lowermost end of the first lever arm, and wherein a second linear power source, such as a linear actuator, is rotatably connected at its uppermost end to the upper frame in a fulcrum and directly or indirectly connected at its lowermost end to the second lever arm in such a way that an extension of the length of the second linear power source causes the end of the upper frame, to which the second power force is connected, to be forced away from the second lever arm.

Such a combined lift and tilt system enables for simultaneously performing both lifting and tilting functions (to both sides from a horizontal position) with a single system.

In an embodiment of the invention, the sliding engagement between the second lever arm and the lower frame is obtained by means of a roller or a slider suspended in a suspension point at the lowermost end of the second lever arm.

In an embodiment of the invention, the first linear power source is connected to the first lever arm in a way that is symmetric to the way, in which the second linear power source is connected to the second lever arm.

If the system is "mirrored" like this, it means that a parallel lift of the upper frame from the lower frame can be obtained by controlling the two linear power sources simultaneously and identically.

In an embodiment of the invention, the combined lift and tilt system further includes a control system arranged to be able to control the motions of the first and second linear power source individually and/or simultaneously.

In an embodiment of the invention, the combined lift and tilt system is dimensioned to be able to lift a load of at least 180 kg, preferably at least 250 kg.

In an embodiment of the invention, the combined lift and tilt system is dimensioned to be able to lift a load over a range of at least 250 mm, preferably at least 300 mm.

In an embodiment of the invention, the combined lift and tilt system is dimensioned so that the height thereof in a fully collapsed configuration is less than 125 mm, preferably less than 90 mm.

In an embodiment of the invention, the combined lift and tilt system is configured to be able to tilt the upper frame in an angle of at least 40°, preferably at least 60°, compared to the lower frame to one side or the other.

A lift and tilt system with such characteristics is very suitable for being used in applications with limited space and demands for a high lifting capacity and flexible tilt functions like, for instance, as a built-in seat hoist in a wheel chair.

In another aspect of the invention, it relates to a wheel chair with a built-in seat hoist including a combined lift and tilt system.

DRAWINGS

Figure 1B:
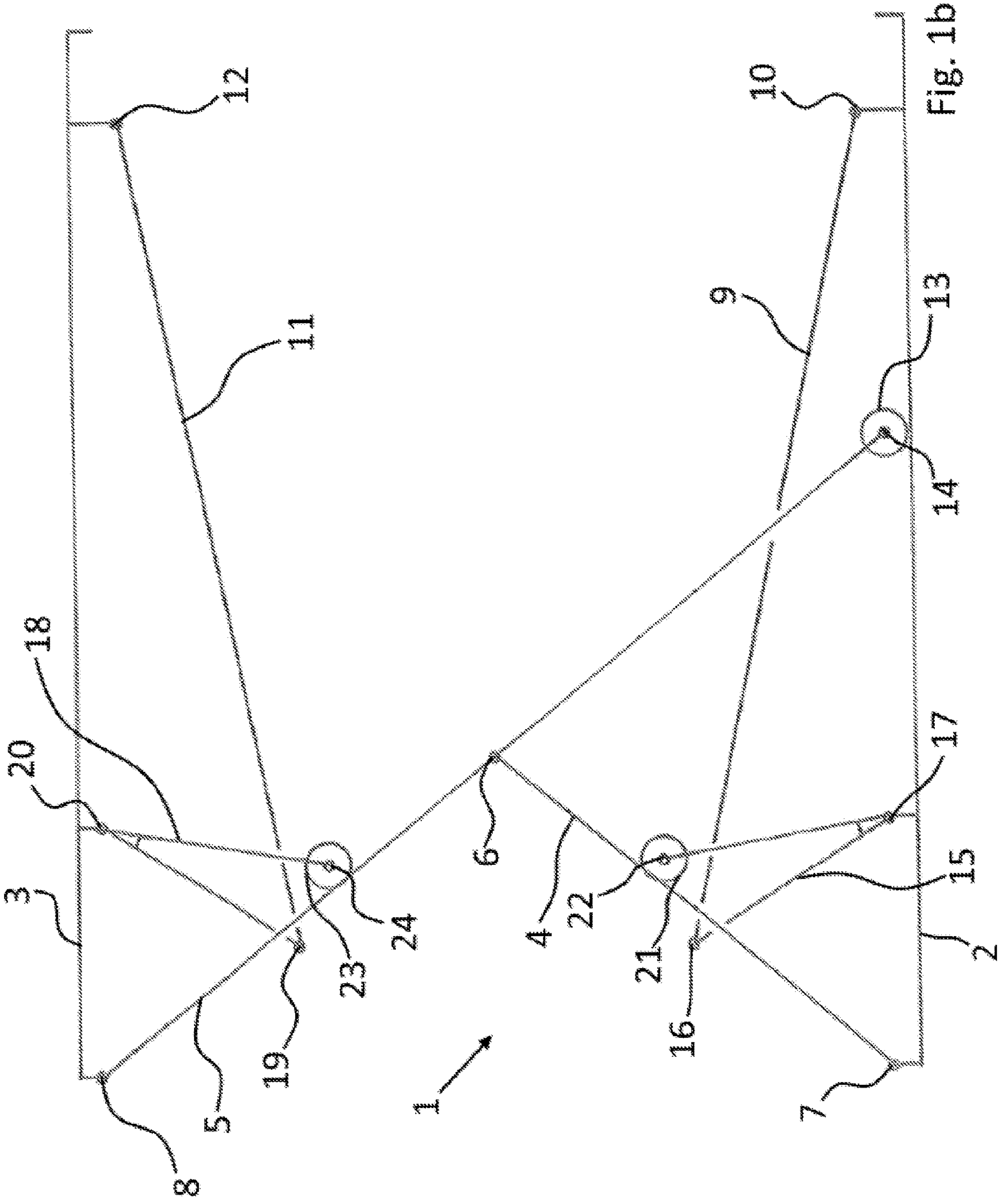
Figure 1C:
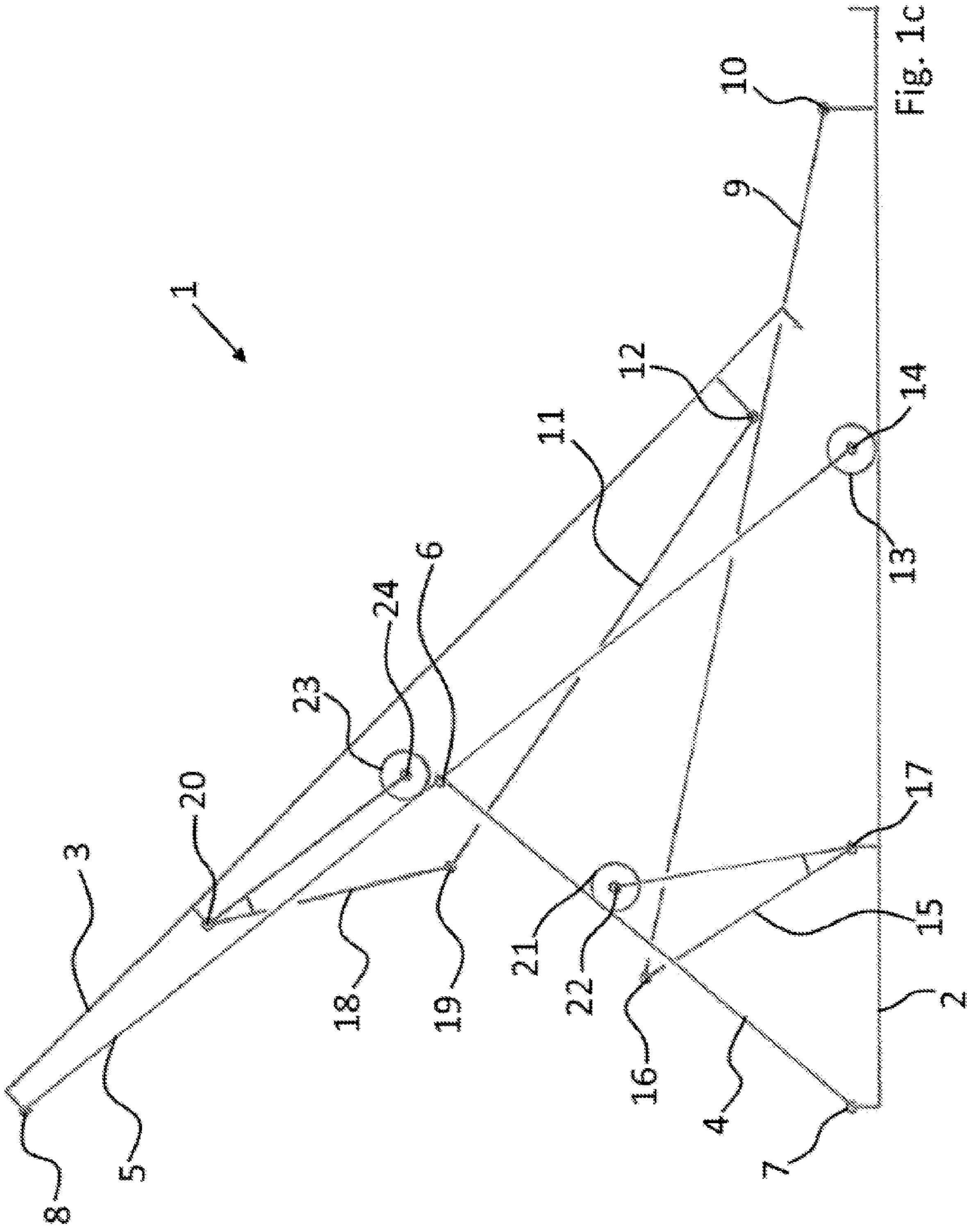
Figure 1D:
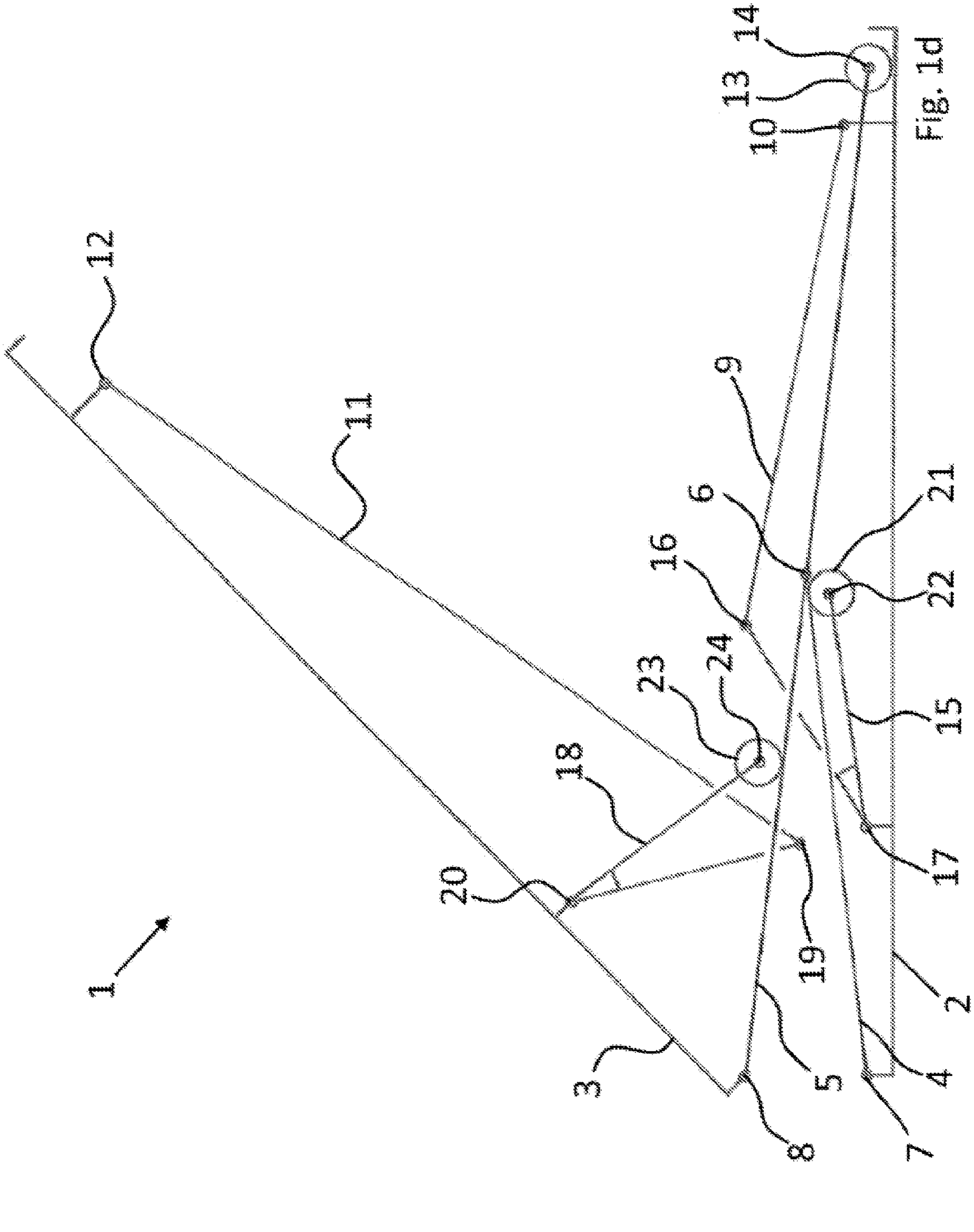
Figure 1E:
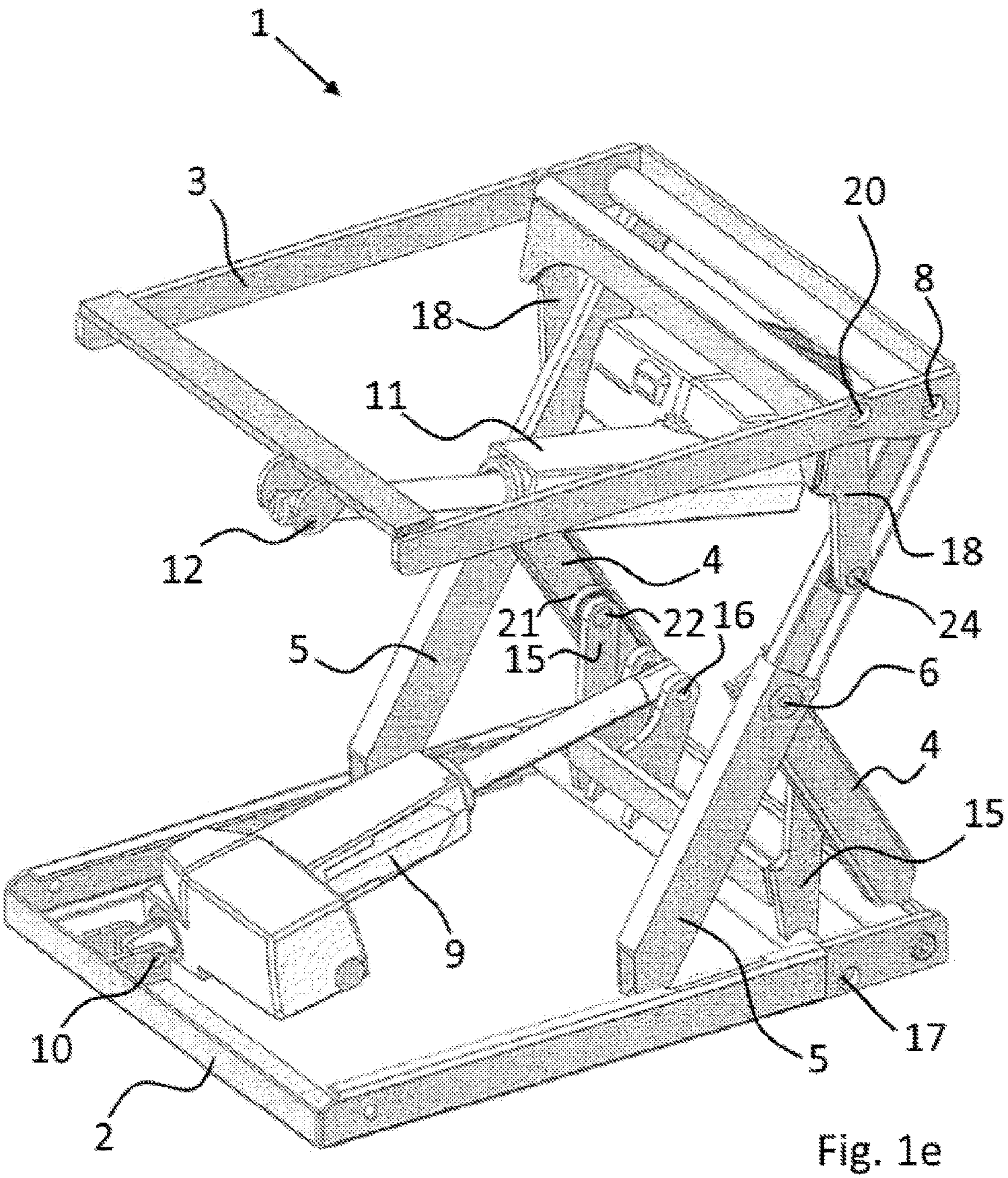
Figure 2A:
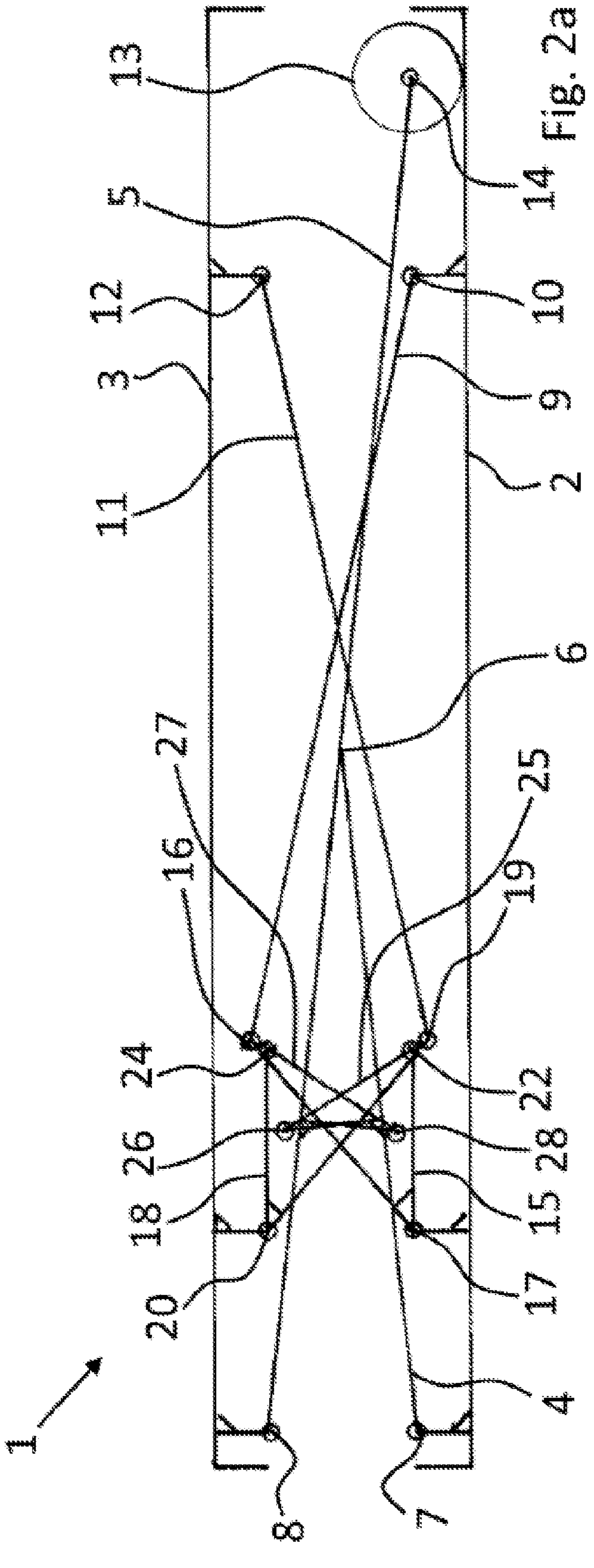
Figure 2B:
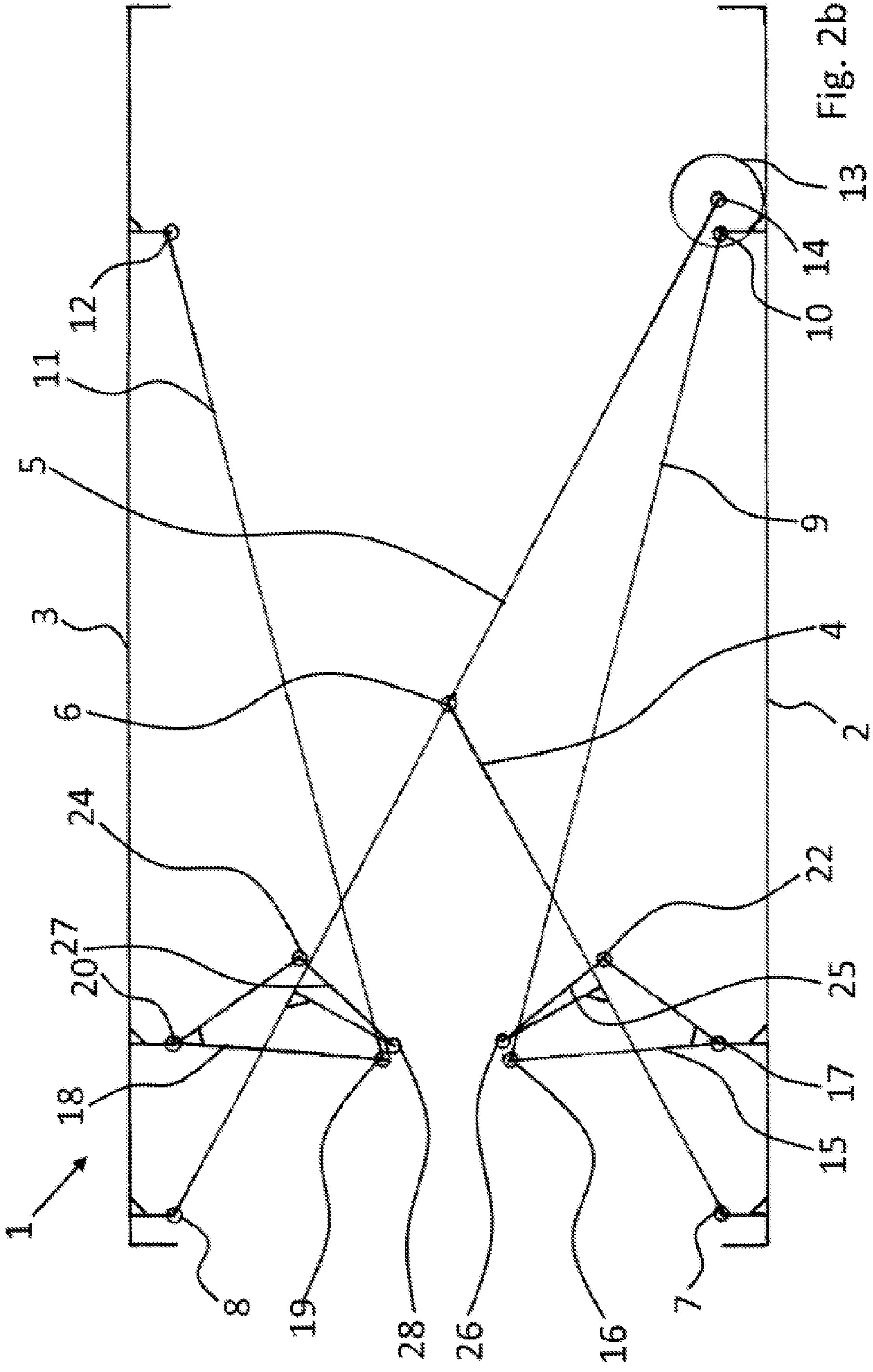
Figure 2C:
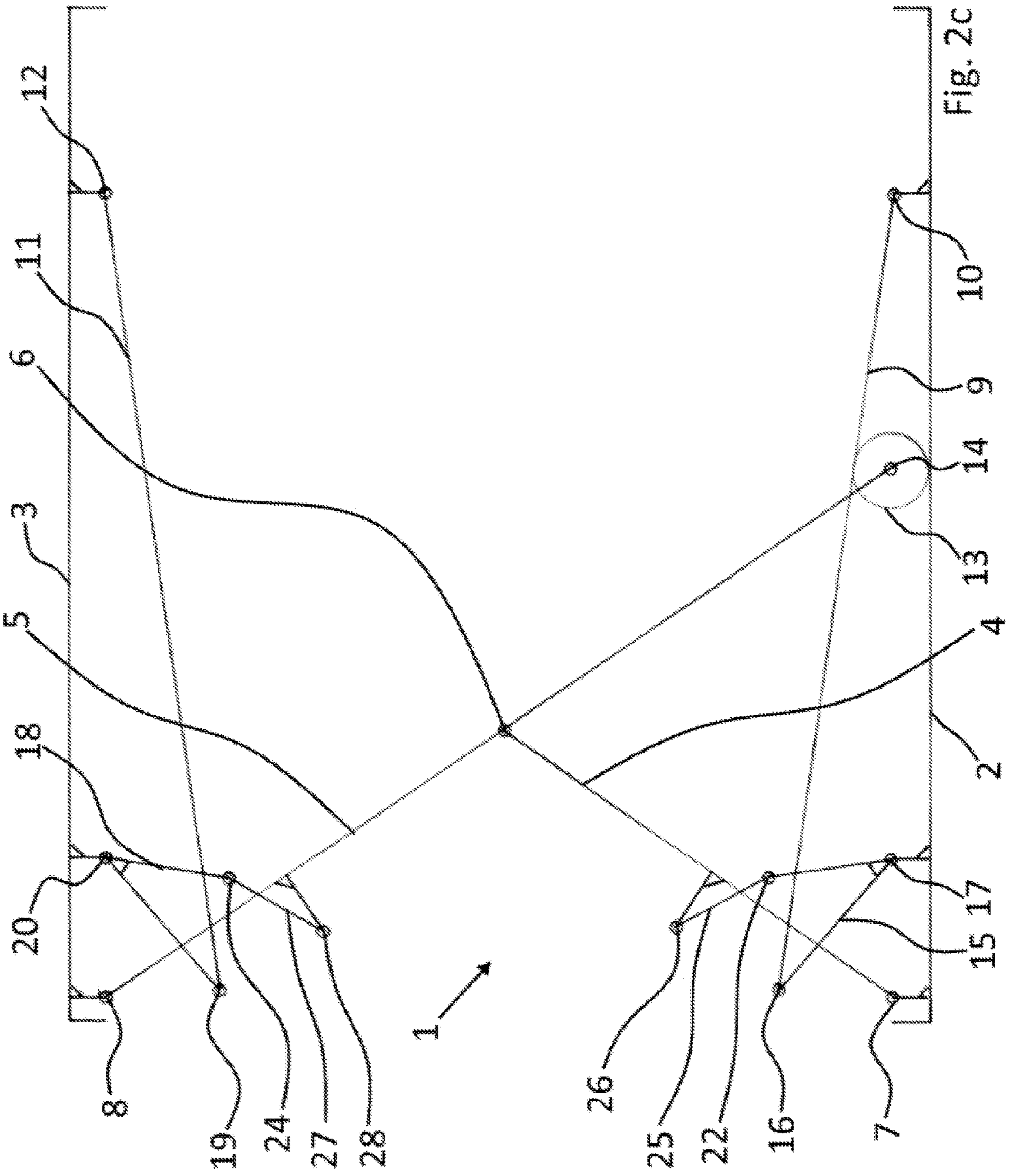
Figure 2D:
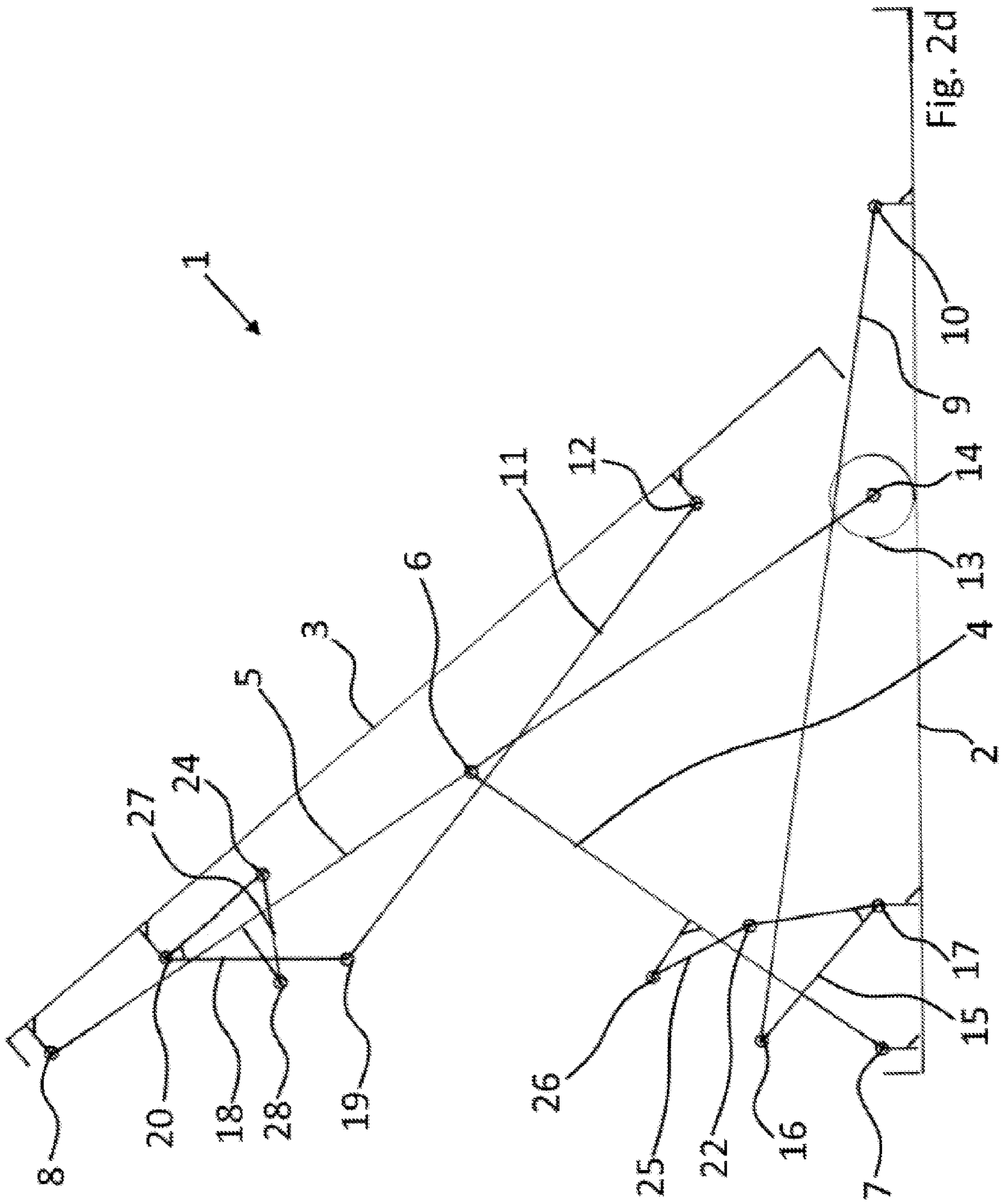
Figure 2E:
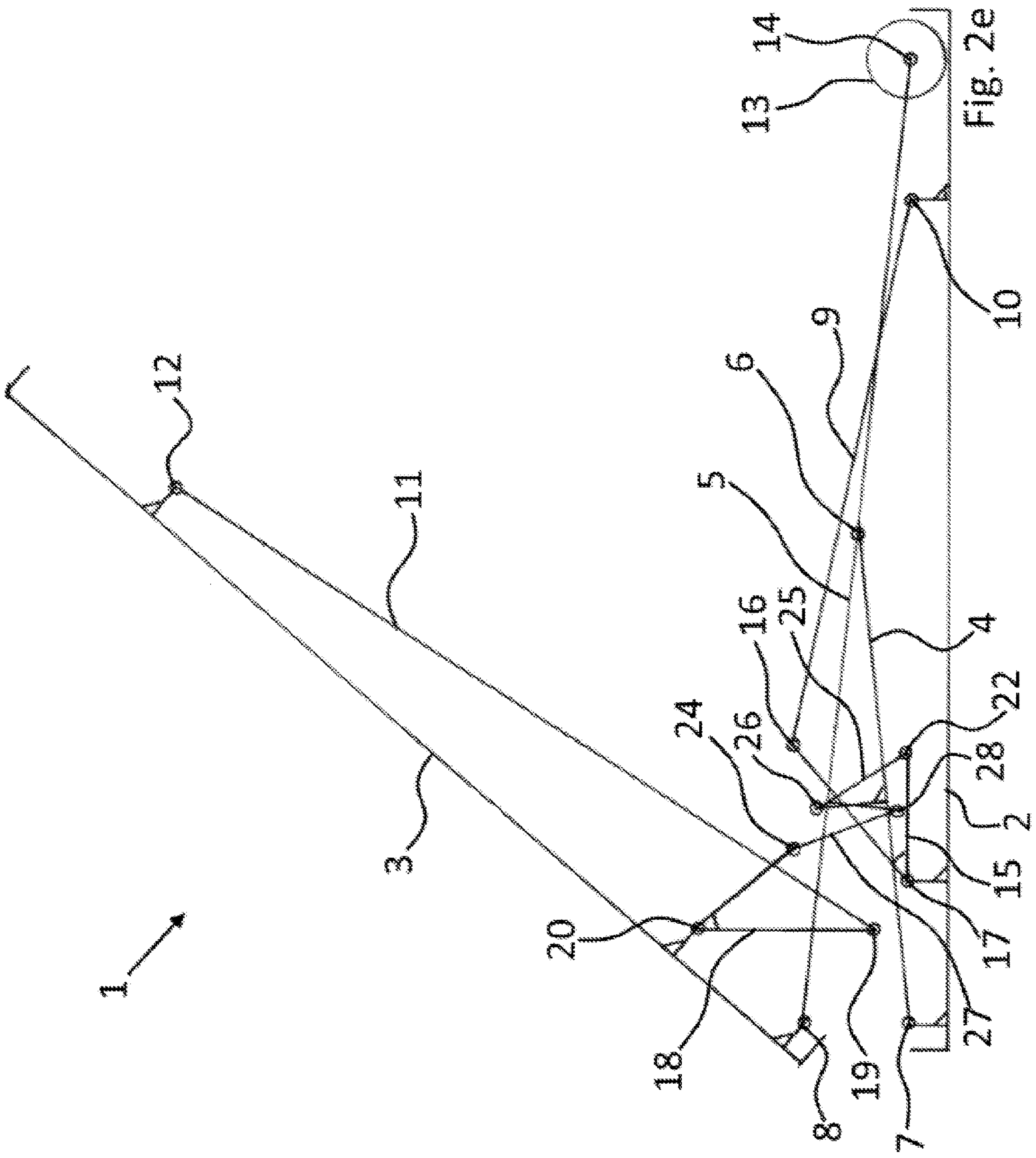
Figure 3A:
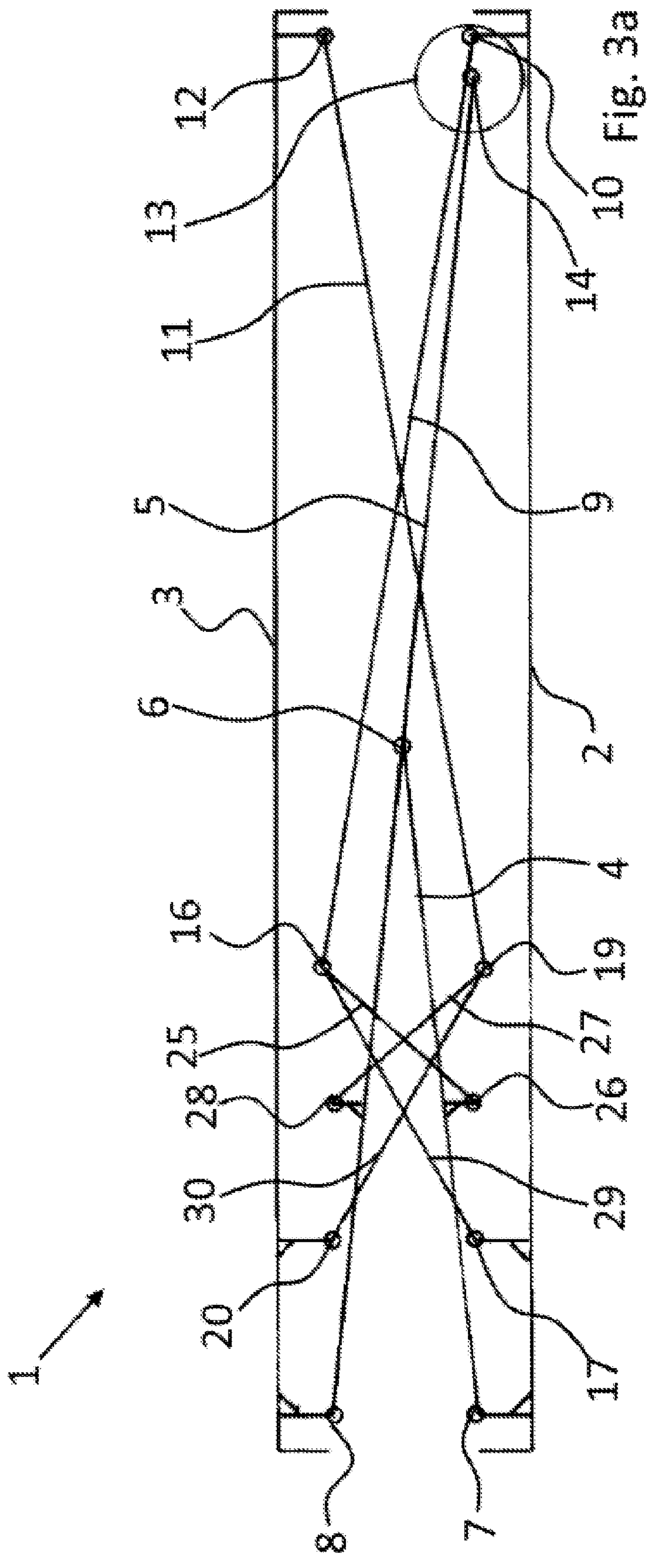
Figure 3B:
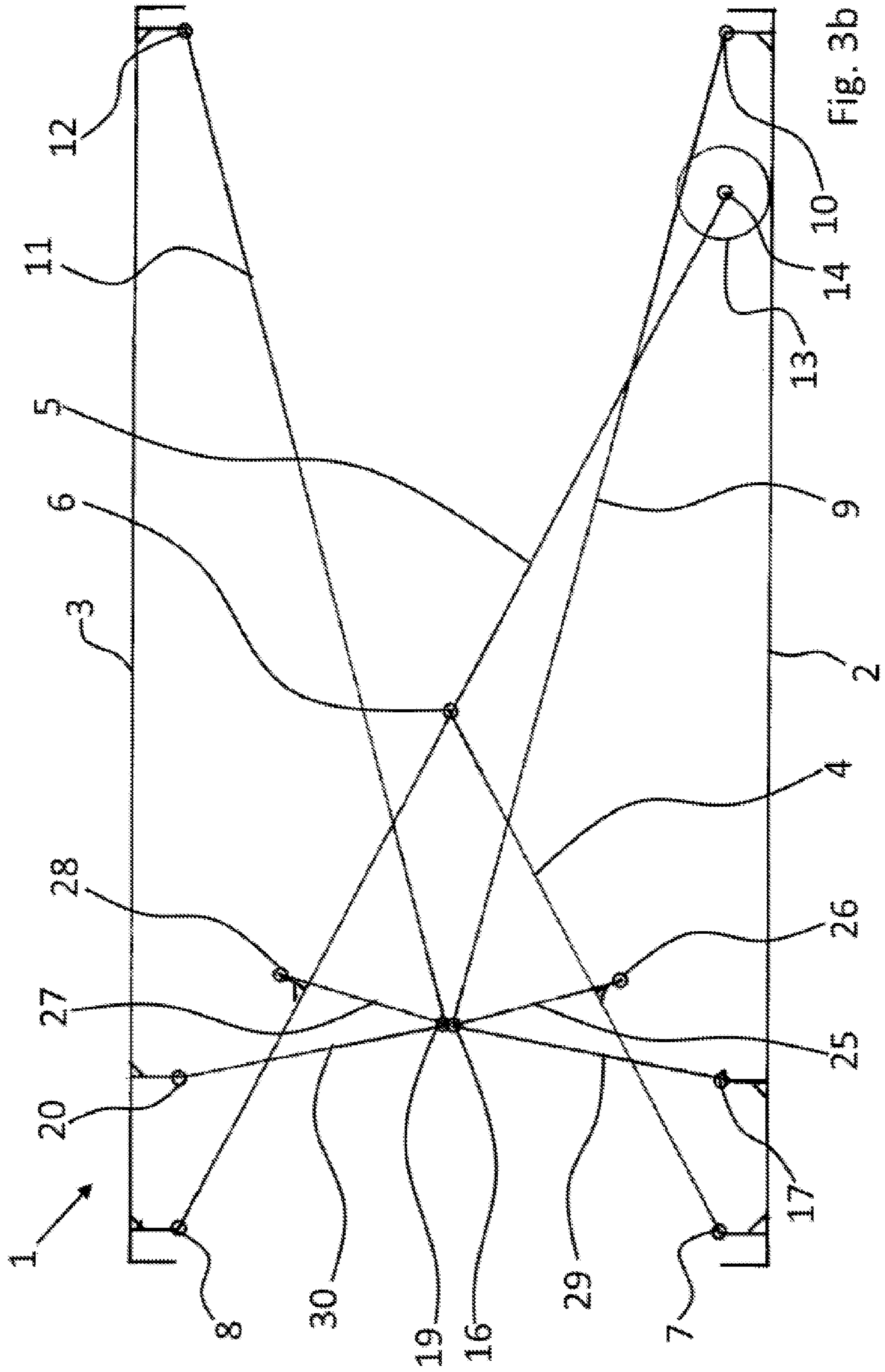
Figure 3C:
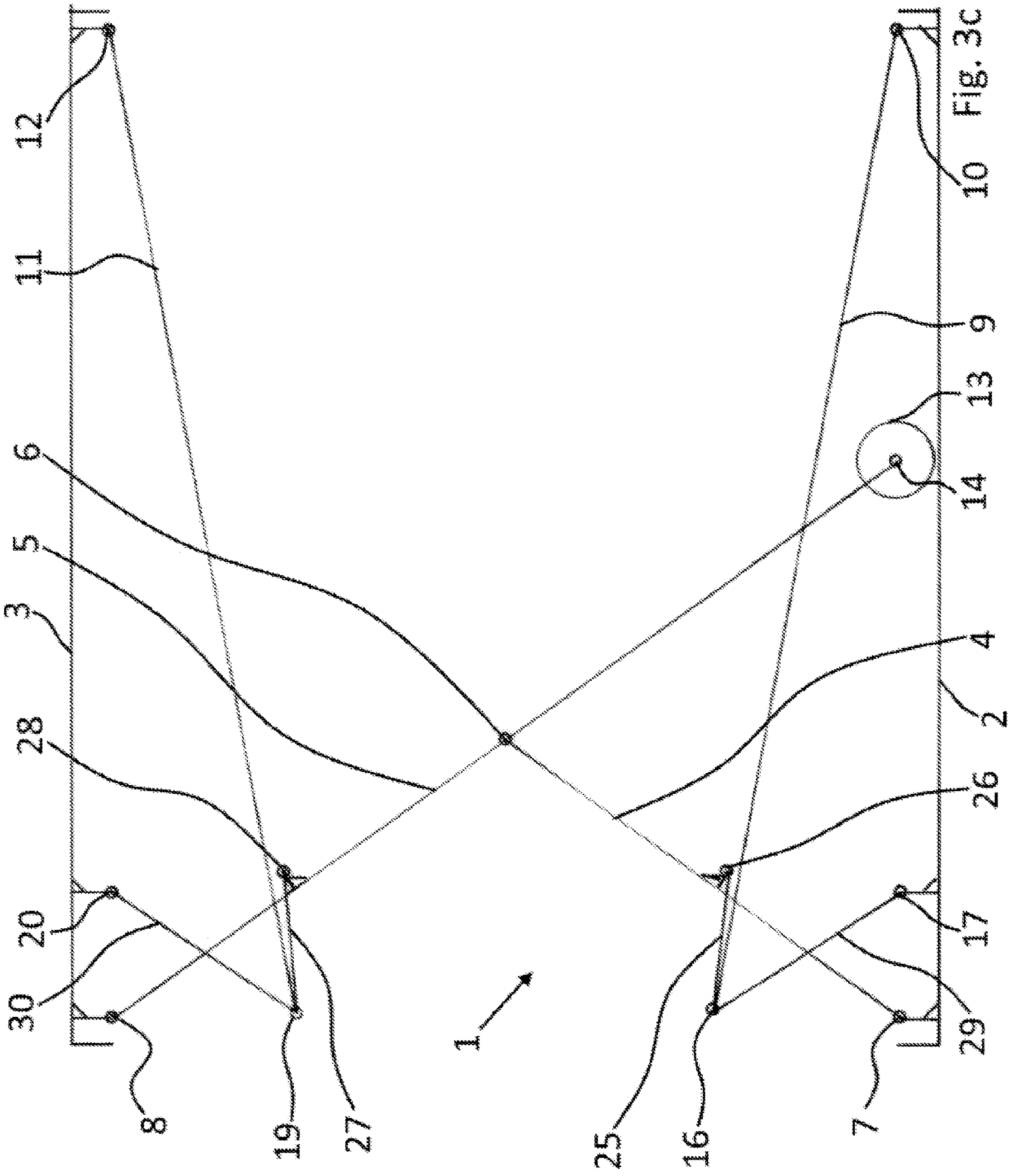
Figure 3D:
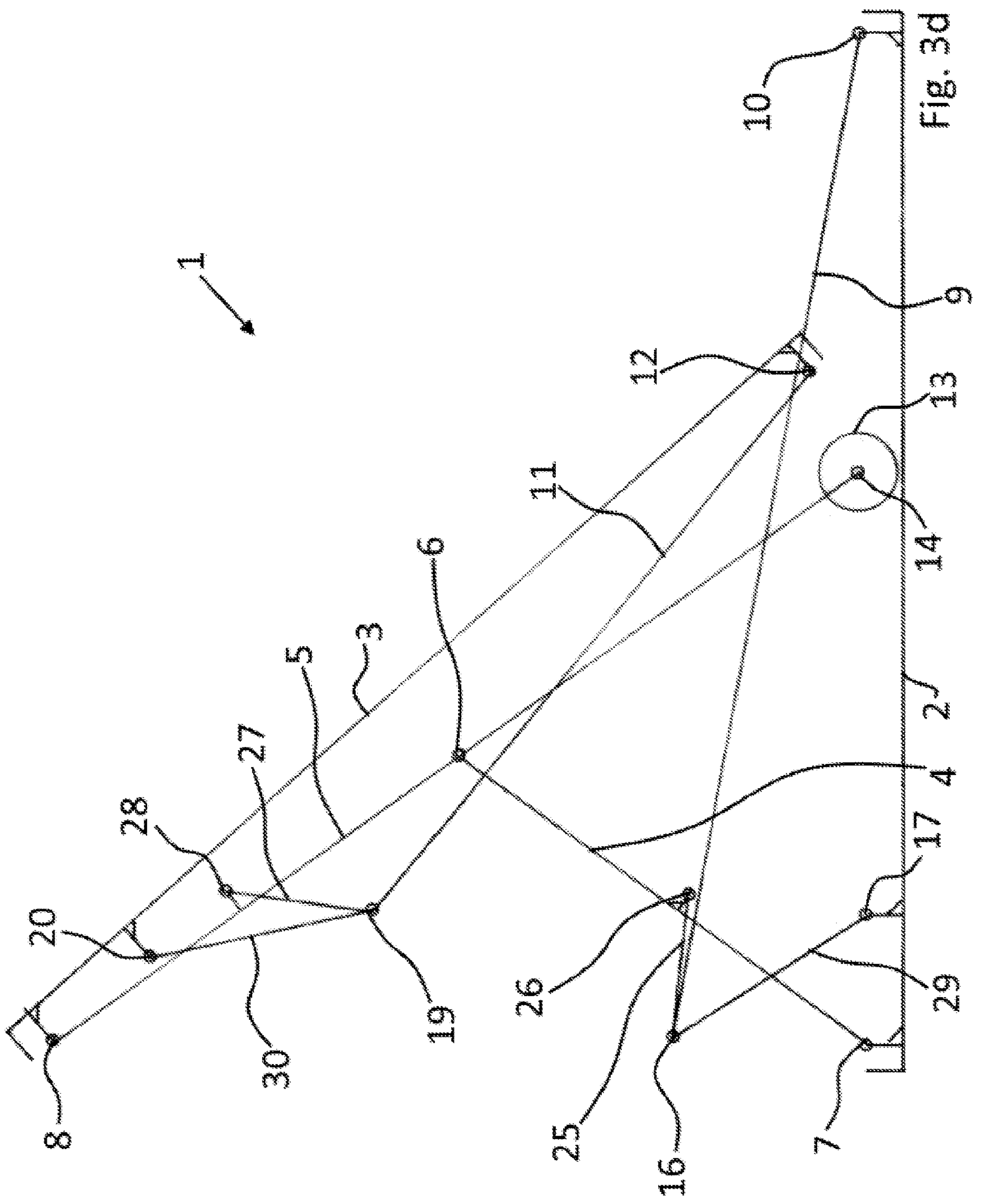
Figure 3E:
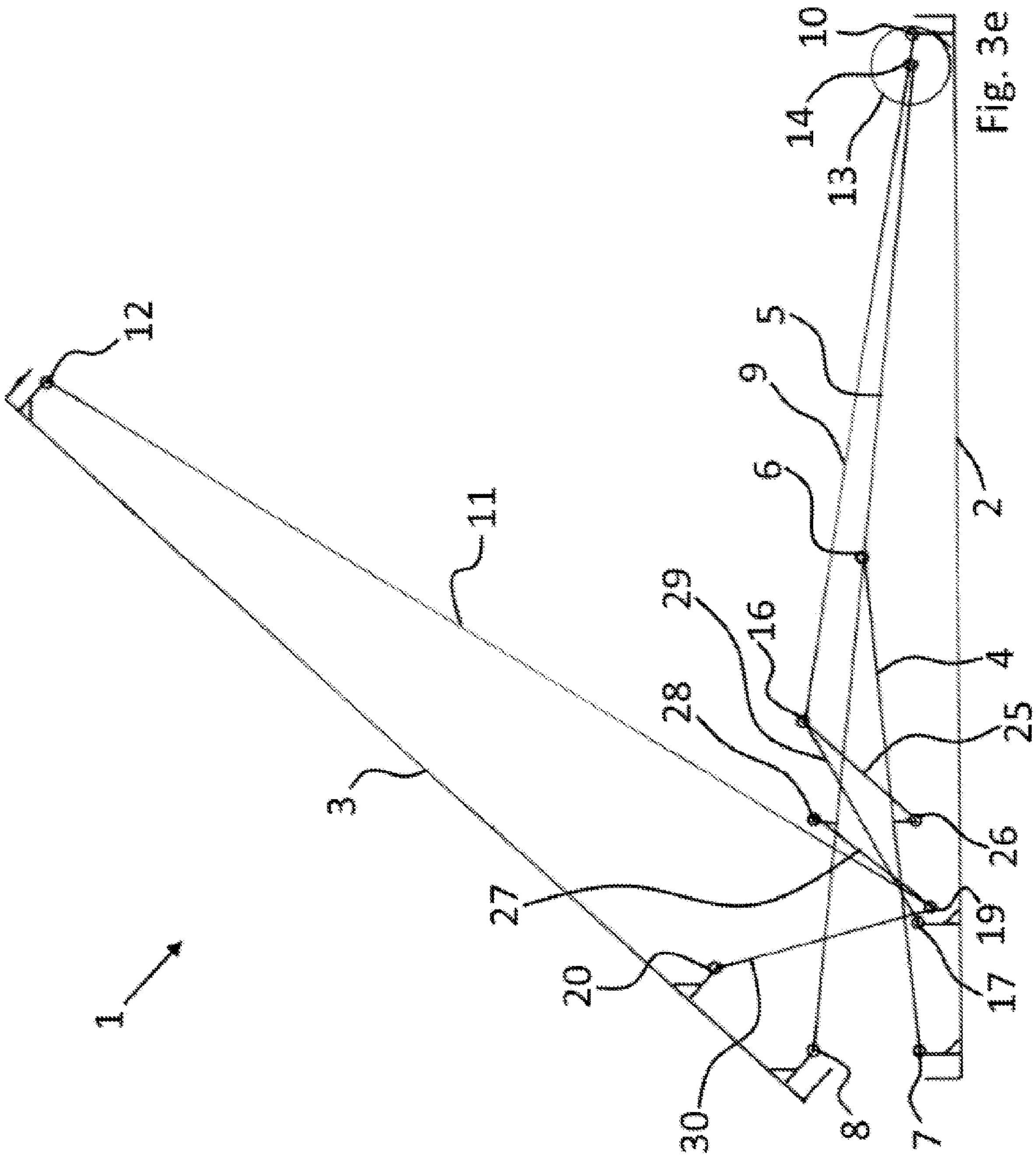

In the following, a few exemplary embodiments of the invention are described in more detail with reference to the drawings, of which FIG. 1*a* is a principle sketch or a lift and tilt system according to a first embodiment of the invention in a fully collapsed configuration, FIG. 1*b* is a principle sketch of the same lift and tilt system in a fully lifted configuration, FIG. 1*c* is a principle sketch of the same lift and tilt system in a fully positively tilted configuration, FIG. 1*d* is a principle sketch of the same lift and tilt system in a fully negatively tilted configuration, FIG. 1*e* is a perspective view of the same lift and tilt system in a fully lifted and slightly positively tilted configuration, FIG. 2*a* is a principle sketch or a lift and tilt system according to a second embodiment of the invention in a fully collapsed configuration, FIG. 2*b* is a principle sketch of the same lift and tilt system in a partly lifted configuration, FIG. 2*c* is a principle sketch of the same lift and tilt system in a fully lifted configuration, FIG. 2*d* is a principle sketch of the same lift and tilt system in a fully positively tilted configuration, FIG. 2*e* is a principle sketch of the same lift and tilt system in a fully negatively tilted configuration, FIG. 3*a* is a principle sketch or a lift and tilt system according to a third embodiment of the invention in a fully collapsed configuration, FIG. 3*b* is a principle sketch of the same lift and tilt system in a partly lifted configuration, FIG. 3*c* is a principle sketch of the same lift and tilt system in a fully lifted configuration, FIG. 3*d* is a principle sketch of the same lift and tilt system in a fully positively tilted configuration and FIG. 3*e* is a principle sketch of the same lift and tilt system in a fully negatively tilted configuration,

DETAILED DESCRIPTION OF THE INVENTION

FIGS. 1*a*-1*d* are principle sketches of a lift and tilt system 1 according to a first embodiment of the invention in a fully collapsed, in a fully lifted, in a fully positively tilted and in a fully negatively tilted configuration, respectively. FIG. 1*e* is a perspective view of the same lift and tilt system 1 in a fully lifted and slightly positively tilted configuration.

A first lever arm 4 and a second lever arm 5, which are rotatably connected to each other in a pivotal point 6. In practice, there is such a pair of lever arms 4, 5 in both sides of the lift and tilt system 1. For the sake of explanation, however, the following section explains the function of one such pair of lever arms 4, 5.

The first lever arm 4 is rotatably connected at its lowermost end to a lower frame 2 in a fulcrum 7 and at its uppermost end to the pivotal point 16. The second lever arm 5 is rotatably connected at its uppermost end to an upper frame 3 near a first end thereof in a fulcrum 8 and in sliding engagement with the lower frame 2 at its lowermost end by means of a roller 13, which is suspended in a suspension point 14 on the second lever arm 5.

A first torque arm 15 is rotatably connected to the lower frame 2 in a fulcrum 17 and provided with a suspension point 22, in which a roller or slider 21 is suspended. A first linear power source 9, such as a linear actuator, is rotatably connected at its lowermost end to the lower frame 2 in a fulcrum 10 and rotatably connected at its uppermost end to the first torque arm 15 in a suspension point 16.

The first linear power source 9 and the first torque arm 15 are configured in such a way that, when the length of the first linear power source 9 is extended, the first torque arm 15 rotates around the fulcrum 17 and the roller or slider 21 on the first torque arm 15 moves in a downward direction along the first lever arm 4. Thereby, the pivotal point 6 and the first end of the upper frame 3, to which the second lever arm 5 is connected, is forced away from the lower frame 2.

A similar construction constitutes the remaining part of lift and tilt system 1:

A second torque arm 18 is rotatably connected to the upper frame 3 in a fulcrum 20 and provided with a suspension point 24, in which a roller or slider 23 is suspended. A second linear power source 11, such as a linear actuator, is rotatably connected at its uppermost end to the upper frame 3 in a fulcrum 12 near a second end thereof opposite the first end, at which the second lever arm 5 is connected. At its lowermost end, the second linear power source 11 is rotatably connected to the second torque arm 18 in a suspension point 19.

The second linear power source 11 and the second torque arm 18 are configured in such a way that, when the length of the second linear power source 11 is extended, the second torque arm 18 rotates around the fulcrum 20 and the roller or slider 23 on the second torque arm 18 moves in an upward direction along the second lever arm 5. Thereby, the second end of the upper frame 3 is forced away from the lower frame 2.

When both of the linear power sources 9, 11 are in their most contracted states, the lower frame 2 and the upper frame 3 are parallel to each other, and the lift and tilt system 1 is fully collapsed as illustrated in FIG. 1*a*.

If the lower frame 2 is placed on a more or less horizontal surface, this means that a lift of the upper frame 3 can be obtained by extending the respective lengths of the two linear power sourced 9, 11 in such a way that the first and second ends of the upper frame 3 are kept at the same distance from the lower frame 2 at all times. This is most easily obtained if the two halves of the system are identical, in which case a parallel lift can be obtained by controlling the two linear power sources 9, 11 simultaneously and identically.

A positive tilt as the one illustrated in FIG. 1*c* can be obtained by activating only the first linear power source 9, whereas a negative tilt as the one illustrated in FIG. 1*d* can be obtained by activating only the second linear power source 11.

FIGS. 2*a*-2*e* are principle sketches of a lift and tilt system 1 according to a second embodiment of the invention in a fully collapsed, in a partly lifted, in a fully lifted, in a fully positively tilted and in a fully negatively tilted configuration, respectively. The function of this second embodiment is the same as the function of the first embodiment and the construction of the second embodiment is rather similar to that of the first embodiment.

Basically, the differences between the first and second embodiments are the following:

- the rollers or sliders 21, 23 on the first torque arm 15 and the second torque arm 18, respectively, have been removed
- a first lifting arm 25 is arranged between the suspension point 22 on the first torque arm 15 and a suspension point 26 on the first lever arm 4
- a second lifting arm 27 is arranged between the suspension point 24 on the second torque arm 18 and a suspension point 28 on the second lever arm 5

FIGS. 3*a*-3*e* are principle sketches of a lift and tilt system 1 according to a third embodiment of the invention in a fully collapsed, in a partly lifted, in a fully lifted, in a fully positively tilted and in a fully negatively tilted configuration, respectively. The function of this second embodiment is the same as the function of the first and second embodiments and the construction of the third embodiment is rather similar to that of the second embodiment.

Basically, the differences between the second and third embodiments are the following:

the first torque arm 15 has been replaced by a first control arm 29 extending between the suspension point 16 on the first linear power source 9 and the fulcrum 17 the second torque arm 18 has been replaced by a second control arm 30 extending between the suspension point 19 on the second linear power source 11 and the fulcrum 20 the first lifting arm 25 is arranged between the suspension point 16 on the first linear power source 9 and the suspension point 26 on the first lever arm 4 the second lifting arm 27 is arranged between the suspension point 19 on the second linear power source 11 and the suspension point 28 on the second lever arm 4

As mentioned, a mirrored/symmetric configuration of the lift and tilt system 1 will typically be advantageous, primarily for simplifying the control of the two linear power sources 9, 11 during lifting operations, in which the two ends of the upper frame 3 must be lifted simultaneously. In special cases, however, it might be necessary to sacrifice the symmetry if specific functions are required. This could, for instance, be the case if a "stand up function" is a required in a wheel chair, which requires a positive tilt of the seat of up to as much as around 80°.

LIST OF REFERENCE NUMBERS

1. Lift and tilt system
2. Lower frame
3. Upper frame
4. First lever arm
5. Second lever arm
6. Pivotal point for first lever arm and second lever arm
7. Fulcrum for first lever arm on lower frame
8. Fulcrum for second lever arm on upper frame
9. First linear power source
10. Fulcrum for first linear power source on lower frame
11. Second linear power source
12. Fulcrum for second linear power source on upper frame
13. Roller or slider on second lever arm
14. Suspension point for roller or slider on second lever arm
15. First torque arm
16. Suspension point on first linear power source
17. Fulcrum on lower frame
18. Second torque arm
19. Suspension point on second linear power source
20. Fulcrum on upper frame
21. Roller or slider on first torque arm
22. Suspension point on first torque arm
23. Roller or slider on second torque arm
24. Suspension point on second torque arm
25. First lifting arm
26. Suspension point for first lifting arm on first lever arm
27. Second lifting arm
28. Suspension point for second lifting arm on second lever arm
29. First control arm
30. Second control arm

The invention claimed is:

1. A combined lift and tilt system comprising:

a lower frame; and an upper frame that is connected to the lower frame by a first lever arm and a second lever arm that are rotatably connected to each other in a pivotal point, wherein, at least in a contracted configuration of the combined lift and tilt system, the lower frame and the upper frame are substantially parallel to each other;

wherein a lowermost end of the first lever arm is rotatably connected to the lower frame in a first fulcrum and the first lever arm is provided with a first suspension point; and wherein an uppermost end of the second lever arm is rotatably connected to the upper frame in a second fulcrum and the second lever arm is provided with a second suspension point and a lowermost end of the second lever arm is in sliding engagement with the lower frame in such a way that, when the lowermost end of the second lever arm is moved towards the lowermost end of the first lever arm, an end of the upper frame, to which the uppermost end of the second lever arm is connected, is forced away from the lower frame;

a lowermost end of a first linear power source is rotatably connected to the lower frame in a third fulcrum and, directly or indirectly, an uppermost end of the first linear power source is connected to the first lever arm in such a way that an extension of a length of the first linear power source causes the lowermost end of the second lever arm to be pulled towards the lowermost end of the first lever arm; and an uppermost end of a second linear power source is rotatably connected to the upper frame in a fourth fulcrum and, directly or indirectly, a lowermost end of the second linear power source is connected to the second lever arm in such a way that an extension of a length of the second linear power source causes the upper frame, to which the second power source is connected, to be forced away from the second lever arm, wherein a first lifting arm is arranged between the first suspension point on the first lever arm and a third suspension point on a first torque arm rotatably connected to the lower frame in a fifth fulcrum and a second lifting arm is arranged between the second suspension point on the second lever arm and a fourth suspension point on a second torque arm rotatably connected to the upper frame in a sixth fulcrum.

2. The combined lift and tilt system according to claim 1, wherein the sliding engagement between the second lever arm and the lower frame is obtained by a roller or a slider suspended in a suspension point at the lowermost end of the second lever arm.

3. The combined lift and tilt system according to claim 1, further comprising a control system arranged to control the motions of the first power source and the second power source individually and/or simultaneously.

4. The combined lift and tilt system according to claim 1, wherein the combined lift and tilt system is dimensioned to be able to lift a load of at least 180 kg.

5. The combined lift and tilt system according to claim 1, wherein the combined lift and tilt system is dimensioned to be able to lift a load over a range of at least 250 mm.

6. The combined lift and tilt system according to claim 1, wherein the combined lift and tilt system is dimensioned so that a height thereof in a fully collapsed configuration is less than 125 mm.

7. The combined lift and tilt system according to claim 1, wherein the combined lift and tilt system is configured to tilt the upper frame in an angle of at least 40° compared to the lower frame.

8. A wheel chair with a built-in seat hoist comprising:

a seat; and a combined lift and tilt system that adjusts a height and/or inclination of the seat, wherein the combined lift and tilt system comprises:

a lower frame; and an upper frame that is connected to the lower frame by a first lever arm and a second lever arm that are rotatably connected to each other in a pivotal point, wherein, at least in a contracted configuration of the combined lift and tilt system, the lower frame and the upper frame are substantially parallel to each other;

wherein a lowermost end of the first lever arm is rotatably connected to the lower frame in a first fulcrum and the first lever arm is provided with a first suspension point; and wherein an uppermost end of the second lever arm is rotatably connected to the upper frame in a second fulcrum and the second lever is provided with a second suspension point and a lowermost end of the second lever arm is in sliding engagement with the lower frame in such a way that, when the lowermost end of the second lever arm is moved towards the lowermost end of the first lever arm, an end of the upper frame, to which the uppermost end of the second lever arm is connected, is forced away from the lower frame;

a lowermost end of a first linear power source is rotatably connected to the lower frame in a third fulcrum and, directly or indirectly, an uppermost end of the first linear power source is connected to the first lever arm in such a way that an extension of a length of the first linear power source causes the lowermost end of the second lever arm to be pulled towards the lowermost end of the first lever arm; and an uppermost end of a second linear power source is rotatably connected to the upper frame in a fourth fulcrum and, directly or indirectly, a lowermost end of the second linear power source is connected to the second lever arm in such a way that an extension of a length of the second linear power source causes the upper frame, to which the second power source is connected, to be forced away from the second lever arm, wherein a first lifting arm is arranged between the first suspension point on the first lever arm and a third suspension point on a first torque arm rotatably connected to the lower frame in a fifth fulcrum and a second lifting arm is arranged between the second suspension point on the second lever arm and a fourth suspension point on a second torque arm rotatably connected to the upper frame in a sixth fulcrum.

* * * * *